HENRY H. EDGERTON.  
GAS METERS.
118221     FIG. 1.     PATENTED AUG 22 1871
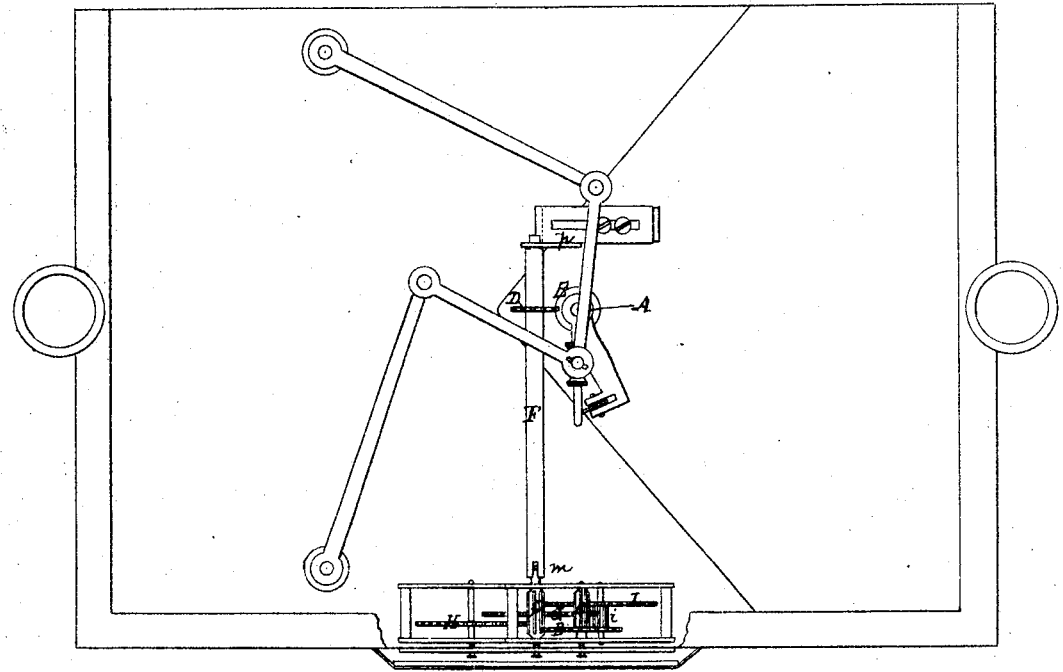
FIG. 2.    FIG. 3.    FIG. 4.
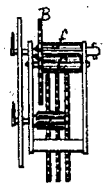 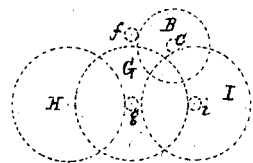 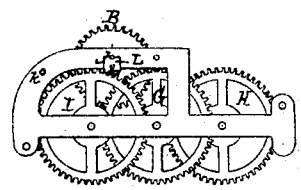
FIG. 5.
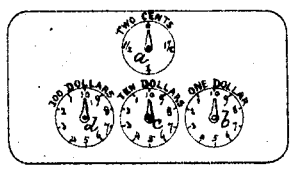
FIG. 6.    FIG. 7.
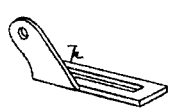
Henry H. Edgerton  
by his attorney  
A Pollok
WITNESSES. C. B. Nottingham.  
Ewell A. Dick

118,221

UNITED STATES PATENT OFFICE.

HENRY H. EDGERTON, OF FORT WAYNE, INDIANA.

IMPROVEMENT IN REGISTERS FOR GAS-METERS.

Specification forming part of Letters Patent No. 118,221, dated August 22, 1871.

*To all whom it may concern:*

Be it known that I, HENRY H. EDGERTON, of Fort Wayne, in the county of Allen and State of Indiana, have invented a new and Improved Mode of Registration for Gas-Meters, of which the following is a specification:

My invention relates to gas-meters, in which the value of the gas consumed is indicated directly in dollars and cents; and it consists in the combination in such a meter of the means substantially as hereinafter described, whereby registrations varying according to different values placed upon the gas may be obtained without any change or alteration in the registering-train proper.

The manner in which my invention is or may be carried into effect will be understood by reference to the accompanying drawing, in which—

Figure 1 is a plan view of a meter made in accordance with my invention. Fig. 2 is an end elevation of the registering apparatus. Fig. 3 indicates the position occupied by the cog-wheels and pinions of the registering apparatus, looking at the same from the front. Fig. 4 is a rear view of the gearing and frame of said apparatus. Fig. 5 is a front view of the dial-plate. Figs. 6 and 7 are views of detached parts, which will be hereinafter referred to.

The meter represented in the drawing is one in which a complete revolution or a filling and emptying of the meter-diaphragms delivers one-sixth cubic foot of gas. The revolution of the spindle A, Fig. 1, then, indicating one-sixth of a cubic foot per revolution, and gearing by the endless screw E into the cog-wheel D, having twelve cogs, one entire revolution of the shaft F will represent two cubic feet; and supposing the rate agreed upon be ten dollars per one thousand cubic feet, the index of the dial, *a*, Fig. 5, will, being directly attached to the shaft F, indicate two cents. This same shaft gears by a pinion, *f*, of six cogs, into the wheel B, Fig. 3, of thirty cogs, consequently one revolution of B indicates ten cents. Upon the same axis with the wheel B is the pinion C, of six cogs, which gears into the wheel I of sixty cogs, so that one revolution of the latter represents one hundred cents, or one dollar, as shown by the dial *b*, a revolution of whose index indicates one dollar. The pinion *i* of six cogs, on the axis of the wheel I, gearing into the wheel G of sixty cogs, and to which is attached the index of the dial *c*, indicates by one revolution ten dollars. The index of the dial *d* indicates one hundred dollars, in the same manner the pinion *g* of six cogs, on the axis of wheel G, gearing into the wheel H of sixty cogs, with which the index of dial *d* is connected.

I have described the meter as adapted to indicate the amount of gas consumed in dollars and cents at the rate of ten dollars per one thousand feet. But it is, of course, desirable that the meter should be so arranged as to permit of the rate of valuation being changed, so that the meter may register the value in accordance with any price agreed upon. To this end I make the shaft F removable or adjustable, uniting it with the axis of the pinion *f* by a universal or equivalent joint, as shown at *m*, and mounting it at the other end in an adjustable or sliding bearing, *p*, shown detached in Fig. 6. The shaft can thus be adjusted toward or away from the worm E, according to the size of the gear which it carries; and by substituting for the wheel D a wheel with any other number of teeth the rate of movement of the registering apparatus can be varied and changed. For instance, the indication at the rate of five dollars per one thousand cubic feet can be effected by removing the adjustable bearing *p*, taking off the cog-wheel D of twelve cogs, and replacing on the same shaft one of twenty-four cogs, of such a pitch as to gear sufficiently well into the worm E. The whole system of indexes will then indicate dollars and cents at five dollars per one thousand cubic feet.

In a like manner any other determined-upon price can be registered in the same manner, limited only by the number of cogs that will gear sufficiently well into the endless screw E. The shaft F being adjustable at both ends allows whatever wheel is placed on it to be fitted accurately in proper position opposite to and so as to gear with the worm.

It now remains to describe the application of this invention to existing meters. The registration is first reduced to ten dollars per thousand in the following manner: The mode of alteration may best be understood by reference to Fig. 4. Before alteration the axis of the wheel B moved in the hole *j*, Fig. 4, and pinion C did not gear directly into the wheel I, but into a wheel of sixty cogs, whose axis rested in the hole *k*, and whose pinion of six cogs geared into the wheel I, thereby revolving the wheel I once for ten dollars or one thousand cubic feet, in place of once for one dollar or one hundred cubic feet. In order to cause the registration to be altered to the rate last mentioned, I entirely remove the wheel running in the hole $k$, and drop the wheel B by means of the piece L, in which it has its bearing at $o$, Fig. 7, until its six-cog pinion C gears into the wheel I, thereby causing the meter to register dollars and cents at ten dollars per thousand cubic feet, as described.

By this means, with little expense and trouble, I can alter existing meters, so that they will register according to the new mode herein specified.

I have not thought it necessary to describe other than the registering apparatus of the meter, as the construction of the diaphragms, connecting-rods, &c., and their combination and operation, are all well known to those skilled in the art to which this invention pertains.

Having described my invention, and the manner in which the same is or may be carried into effect, what I claim, and desire to secure by Letters Patent, is—

In a gas-meter registering the value of the gas consumed in dollars and cents, the combination, with the registering-train proper and the wheel on the spindle receiving motion from the diaphragms, of the means substantially as herein shown and described whereby registrations varying according to different values may be obtained without change or alteration in the registering-train.

In testimony whereof I have signed my name to this specification before two subscribing witnesses.

HENRY H. EDGERTON.

Witnesses:
C. L. HILL,
ROBT. G. McNIECE.